United States Patent
Shimizu et al.

[11] Patent Number: 5,600,457
[45] Date of Patent: Feb. 4, 1997

[54] METHOD FOR FORMING A LIQUID CRYSTAL DEVICE AT ROOM TEMPERATURE

[75] Inventors: Michio Shimizu; Kouji Moriya; Takeshi Nishi; Toshimitsu Konuma, all of Kanagawa, Japan

[73] Assignee: Semiconductor Energy Laboratory Co., Ltd., Kanagawa-ken, Japan

[21] Appl. No.: 72,126

[22] Filed: Jun. 7, 1993

[30] Foreign Application Priority Data

Jun. 9, 1992 [JP] Japan .................................. 4-173712

[51] Int. Cl.⁶ .................................................. G02F 1/1333
[52] U.S. Cl. .................................. 349/89; 349/92; 349/93
[58] Field of Search ........................... 359/52, 51, 100

[56] References Cited

U.S. PATENT DOCUMENTS

| | | | |
|---|---|---|---|
| 4,673,255 | 6/1987 | West et al. | 359/51 |
| 4,888,126 | 12/1989 | Mullen et al. | 359/52 |
| 5,093,471 | 3/1992 | West | 528/418 |
| 5,235,445 | 8/1993 | Hirai et al. | 359/52 |
| 5,301,046 | 4/1994 | Konuma et al. | 359/52 |
| 5,304,323 | 4/1994 | Arai et al. | 359/52 |
| 5,321,533 | 6/1994 | Kamar | 359/100 |

*Primary Examiner*—William L. Sikes
*Assistant Examiner*—Ron Trice
*Attorney, Agent, or Firm*—Sixbey, Friedman, Leedom & Ferguson, PC; Gerald J. Ferguson, Jr.; Jeffrey L. Costelllia

[57] ABSTRACT

An object of the present invention is to provide a dispersion type liquid crystal electro-optical device comprising liquid crystal droplets of uniform size without impairing the scattering properties. The present invention realizes a liquid crystal electro-optical device having excellent scattering properties which is achieved by increasing or decreasing the fraction of the organic constituent of the light-transmitting resin material without changing the amount of the liquid crystal and the number and density of the liquid crystal droplets so that the light scattering properties of the device may not be impaired, and thereby controlling the precipitation temperature of the liquid crystal droplets from the mixture to the vicinity of a temperature convenient in the fabrication, so that the solidification temperature of the resin material can be set at the vicinity of that temperature.

17 Claims, 2 Drawing Sheets

METHOD FOR FORMING A LIQUID CRYSTAL DEVICE AT ROOM TEMPERATURE

BACKGROUND OF THE INVENTION

1. Field of the Invention

The present invention relates to a dispersion-type liquid crystal electro-optical device comprising a liquid crystal/ resin composite comprising a resin having dispersed therein a liquid crystal material or a resin/liquid crystal composite comprising a liquid crystal material having dispersed therein a resin.

2. Prior Art

Liquid crystal electro-optical devices well known and already put to practice heretofore are those operating in TN (twisted nematic) mode or STN (super twisted nematic) mode, in which nematic liquid crystal compositions are used. Recently, liquid crystal electro-optical devices taking advantage of ferroelectric liquid crystals have been also realized. A liquid crystal electro-optical device of the type above basically comprises a first and a second substrate each having provided thereon an electrode and a lead, and a liquid crystal composition incorporated therebetween. Thus, the liquid crystal composition can undergo a transition between states by applying thereto an electric field through the electrodes provided on the substrates. These changes in states are ascribed to the anisotropy of the dielectric constant of the liquid crystal composition itself in the case of nematic liquid crystals, etc., and to the spontaneous polarization in the case of ferroelectric liquid crystals. In this manner, the electro-optical effect due to the changes in state of the liquid crystal molecules can be utilized to give an electro-optical device.

In the TN mode or the STN mode liquid crystal electro-optical devices, the liquid crystal molecules within the plane of the liquid crystal layer in contact with the substrate arrange themselves along the rubbing direction upon applying a rubbing treatment to establish a molecular orientation. The upper and the lower substrates are displaced from each other in such a manner that the rubbing direction of one substrate make an angle in the range of from 90° or from 200° to 290° to that of the other. Thus, at the central portion of the liquid crystal layer, the liquid crystal molecules are arranged helically to minimize the energy between the upper and the lower liquid crystals which are positioned with respect to each other within an angle in the range of from 90° to 290°. Furthermore, in such a construction, the liquid crystal material in an STN mode device may be a mixture with chiral substances if necessary.

In the conventional type of electro-optical devices as described in the foregoing, however, it is requisite to incorporate polarizer sheets and also to maintain the liquid crystal molecules in a regularly oriented manner within the liquid crystal electro-optical device. The treatment for establishing a molecular orientation comprises rubbing the orientation film (which is an organic film in general) with a cotton cloth or a velvet cloth. If no such treatment is applied, the electro-optical effect of the liquid crystals cannot be expected because no uni-direction oriented liquid crystal molecules would be realized. Accordingly, the device inevitably comprises a pair of electrodes to define a space to maintain therein the liquid crystal material. Thus, the liquid crystal is injected into said space and then subjected to orientation treatment to realize an optical effect.

In contrast to the liquid crystal electro-optical device mentioned hereinbefore, there is also known a dispersion-type liquid crystal which can be employed free of such polarizers and rubbing treatment, and which yet provides an image plane having a brighter contrast. The light control layer of this dispersion-type liquid crystal comprises a light-transmitting solid polymer maintaining therein the liquid crystal material in droplets or in a sponge-like structure. The liquid crystal device can be fabricated by dispersing an encapsulated liquid crystal material into a polymer, and then providing said polymer on a substrate as a film or a thin film. The liquid crystal can be encapsulated with gum arabic, poly (vinyl alcohol), gelatin, and the like.

In a dispersion-type liquid crystal comprising liquid crystal molecules encapsulated with polyvinyl alcohol) and having a positive dielectric anisotropy, for example, the liquid crystal molecules arrange themselves in such a manner that the major axes thereof become parallel to the direction of the electric field. If the refraction index of the solid polymer is equivalent to that of the arranged liquid crystal upon application of the electric field, the light control layer turns transparent. When the electric field is turned off, the liquid crystal molecules take a random arrangement, and hence, the refraction index of the liquid crystal material greatly deviates from that of the solid polymer. Thus an opaque state is realized, because the light is scattered by the liquid crystal molecules and the light-transmittance becomes low. The device takes advantage of the difference between the transparent state and the opaque state to provide information of various types. In addition to the encapsulated type, dispersion-type liquid crystals include those comprising liquid crystal materials being dispersed in an epoxy resin; those taking advantage of phase separation between the liquid crystal and the resin, which is realized by irradiating a light beam to a mixture of a liquid crystal and a photo-curable resin to cure the resin; and those comprising a three-dimensionally bonded polymer impregnated with a liquid crystal. In the present invention, the term "dispersion-type liquid crystal" encompasses all the types enumerated above.

The above dispersion-type liquid crystal electro-optical devices are free from polarizer sheets and hence have extremely high light transmittance as compared with those of the conventional electro-optical devices operating in a TN mode, STN mode, etc. More specifically, the transmittance per single polarizer sheet is about 50%. Hence, in an active matrix type electro-optical device using a combination of said polarizer sheets result in a final transmittance of about 1%; in an electro-optical device operating in an STN mode, the actual transmittance is about 20%. Accordingly, much effort in those conventional electro-optical devices is placed to realizing a bright display by increasing illuminance of the back-lighting. In contrast to the conventional electro-optical devices, dispersion-type liquid crystal electro-optical devices transmit 50% or more of the incident light. This is a unique superiority of the dispersion-type liquid crystal electro-optical devices which results from their structure free of any polarizer sheets.

As stated in the foregoing, a dispersion-type liquid crystal takes a transparent state and an opaque state, and because it is capable of transmitting a large amount of light, research and development efforts are generally concerned in realizing a transmitting type device. Particularly among them, projection-type liquid crystal devices are the most actively developed types. A projection-type liquid crystal electro-optical device comprises a liquid crystal electro-optical device panel placed in the light path to intervene in the light beam emitted from the light source, so that the light having passed through this panel may be projected on a wall plane through a slit provided at a predetermined angle. The liquid crystal molecules in this panel provide a white opaque state when they are in a random arrangement at a low level electric field below the threshold value at which the liquid crystal molecules do not respond. The light incident to the panel at this instance is scattered upon passing through the panel to greatly widen the light path thereof. Accordingly, the scattered light is mostly cut off by the slit provided subsequent to the panel. A black state occurs on the wall by thus cutting off the scattered light. When an electric field is applied at an intensity over the threshold value, on the other hand, the liquid crystal molecules arrange themselves in response to the electric field to make a parallel arrangement with respect to the direction of the electric field. Thus, the light incident thereto advances straight forward without being scattered to finally realize a bright state with high luminance on the wall.

In the dispersion-type liquid crystal electro-optical devices as described in the foregoing, the contrast of the display depends on the degree of light scattering corresponding to the change in orientation states of the liquid crystal material. Accordingly, it is required that the liquid crystal material is incorporated in the device as numerous minute droplets. The size of the minute droplets should fall in a range of from about 0.05 to 10 µm. In general, they are about 0.3 to 3 µm in size. Such minute liquid crystal droplets can be fabricated under controlled conditions, particularly under strict control of temperature.

If the resin material is solidified at a temperature higher than that at which the liquid crystal droplets precipitate from a mixed system of a liquid crystal material and a resin material, the mixed system cannot undergo sufficient phase separation as to provide the liquid crystal portion and the resin portion. As a result of such insufficient phase separation, the liquid crystal material solidifies in a surrounded state in the resin to give liquid crystal droplets less than 1 µm in size. Such minute liquid crystal droplets do not contribute to light scattering and, moreover, only few droplets can be obtained under such conditions.

If the resin material is solidified at a temperature lower than that at which the liquid crystal droplets precipitate from s mixed system of a liquid crystal material and a resin material, on the other hand, the liquid crystal droplet having precipitated from the mixed system grows into a larger one, or two or more such droplets contact and fuse with each other to give a larger single droplet. The large droplets obtained in this case are too large to contribute to scattering light. When the resin material and the liquid crystal material are less compatible with each other, the resin material is preferably solidified at a temperature slightly higher than the precipitation temperature of the droplets, because excessively large droplets may result if the resin material is solidified at a temperature lower than the precipitation temperature of the droplets.

On the contrary, the resin material is preferably solidified at a temperature slightly lower than the precipitation temperature of droplets if the resin material is highly compatible with the liquid crystal material, because an insufficient phase separation may result by resin solidification at a temperature higher than the temperature at which the droplets precipitate. It can be seen from the foregoing that droplets of a pertinent size and at a large number thereby can be obtained only under a controlled temperature condition; when the light-transmitting resin material is solidified at the precipitation temperature of the droplets or at the vicinity thereof.

However, if the precipitation of the droplets occurs at too high a temperature, the resin material should be solidified at an elevated temperature. Then, problems concerning, for example, increase in fabrication cost of the liquid crystal electro-optical device, handling of substrates, and reproducibility of the process, must be newly confronted. A solution to these problems is to control the temperature of precipitation of the droplets from the mixed system. The precipitation temperature can be controlled by increasing or decreasing the amount of the light-transmitting resin material. However, this method inevitably increases or decreases the amount of the liquid crystal as to impair the light scattering, because light scattering depends on the number of liquid crystal droplets. Moreover, liquid crystal in excess results in too large and non-uniform liquid crystal droplets which impair light scattering and generate a hysteresis.

SUMMARY OF THE INVENTION

The present invention provides a solution to the aforementioned problems. It provides a liquid crystal electro-optical device which can be fabricated by controlling the precipitation temperature of the liquid crystal droplets without impairing the light scattering properties. More specifically, the mixing ratio of the at least two different organic substances constituting the light-transmitting resin material is varied while maintaining the amount of the liquid crystal and the density of the liquid crystal droplets constant so that the light scattering properties may not be impaired. By thus controlling the mixing ratio of the organic substances, the precipitation temperature of the droplets from the mixed system can be set at a pertinent temperature suited for fabrication, and, by setting the resin solidification temperature at the same temperature, droplets of a uniform size can be obtained to realize a liquid crystal electro-optical device having excellent light scattering properties. A temperature at which the droplet of the liquid crystal is precipitated from a mixture of the liquid crystal and at least two different organic substances is approximately equal to a temperature at which at least two different organic substances are hardened. The liquid crystal 3 is dispersed in the organic substances 4, or the organic substances are dispersed in the liquid crystal 4 as shown in FIG. 3. The electro-optical device in accordance with the present invention comprises an electro-optical modulating layer comprising the liquid crystal and at least two different organic substances, and two substrates sandwiching the electro-optical modulating layer therebetween, and means for applying an electric field to the electro-optical modulating layer. In the fabrication of a dispersion-type liquid crystal electro-optical device comprising a mixture of a liquid crystal material and a light-transmitting resin material in particular, the light-transmitting resin material can be more effectively rendered compatible with the liquid crystal material by increasing the amount of the lower molecular weight component rather than varying the amount of the higher molecular component. In this manner, the solidification temperature at the phase separation can be lowered.

The foregoing fabrication process is particularly suited in cases in which the liquid crystal to be used has a high precipitation temperature. In such cases, the resin solidification must be inevitably conducted at a high temperature corresponding to the precipitation temperature of the liquid crystal droplets. More specifically, the process above is effective when mass production cannot be realized due to the difficulty in handling and to the lack of a temperature controller. According to the process, a liquid crystal electro-optical device having excellent light scattering properties under zero electric field can be realized, because the liquid crystal droplets can be precipitated preferably at room temperature from the mixed system without varying the content of the light-transmitting resin in the mixed system, and yet without reducing the amount of the liquid crystal material and thereby without decreasing the number of liquid crystal droplets.

Furthermore, in the fabrication of a dispersion-type liquid crystal electro-optical device comprising a mixture of a liquid crystal material and a light-transmitting resin material, the precipitation temperature of the liquid crystal droplets can be more effectively elevated by reducing particularly the content of the low molecular weight components from the light-transmitting resin components. In this manner, the process temperature during solidification of the resin can be increased.

The fabrication process above is particularly suited when resin solidification must be conducted inevitably at a low temperature to achieve favorable scattering properties even in cases where liquid crystal having a relatively low precipitation temperature is used. More specifically, the process above is effective when mass production cannot be realized due to the difficulty in handling and to the lack of a temperature controller. According to the process, a liquid crystal electro-optical device having no drop in light scattering properties due to change in size of liquid crystal droplets can be realized, because the liquid crystal droplets can be precipitated preferably at room temperature from the mixed system without varying the content of the light-transmitting resin in the mixed system.

As mentioned in the foregoing, a liquid crystal electro-optical device having excellent light scattering properties, i.e., a display of high contrast, and which can be driven with a pertinent driving voltage can be easily fabricated without increasing or decreasing the liquid crystal fraction in the mixed system of the light-transmitting resin material and the liquid crystal material.

In FIG. 3 is shown schematically a liquid crystal electro-optical device comprising a substrate having provided thereon a transparent electrically conductive film (2). In other embodiments, a MIM (metal-insulator-metal) non-linear element or a thin film transistor may be formed together with the transparent electrically conductive film on one of the substrates.

In general, the transmittance of a dispersion-type liquid crystal does not increase sharply upon application of an electric field. Accordingly, it is unlikely that a dispersion-type liquid crystal is directly matrix-driven using multiple electrodes. It is therefore preferable to aid its drive by installing non-linear elements and thin film transistors. In this manner, the sluggish response of the liquid crystal can be compensated. In other words, each of the pixels can be switched from a scattering state to a light-transmitting state and vice versa while it is matrix driven.

In the liquid crystal electro-optical device according to the present invention, any of the generally used liquid crystals such as nematic, smectic, and cholesteric liquid crystal materials can be used. It should be noted, however, that the fraction of the polymer for the light-transmitting resin within the mixed system and the temperature of precipitating liquid crystal droplets vary depending on the differing characteristics of the selected liquid crystal material.

In the foregoing description, the liquid crystal support is expressed as a light-transmitting resin. However, the resin need not be transparent to all the light covering the entire wavelength. Accordingly, any material having a transmittance of 50% or higher for the wavelength of the light being used in the liquid crystal electro-optical device is suited for use as the support.

In addition, the liquid crystal material being dispersed are expressed as droplets or liquid crystal droplets in the present specification or in FIG. 3. Moreover, the droplets are simply drawn with circles. These expressions and drawings are for explanatory means, and in practice, the dispersed liquid crystal material may take other forms and shapes.

The precipitation temperature of the liquid crystal droplets described in the present specification corresponds to the temperature at which the liquid crystal (inclusive of a liquid crystal state and isotropic phase) appears from a mixed and mutually dissolved state of the liquid crystal material and the light-transmitting resin. The liquid crystal droplets as referred herein mean the liquid crystal phase after the light-transmitting resin is solidified.

Some examples are given below for further explanation.

DETAILED DESCRIPTION OF THE PREFERRED EMBODIMENTS

EXAMPLE 1

Figure 3:
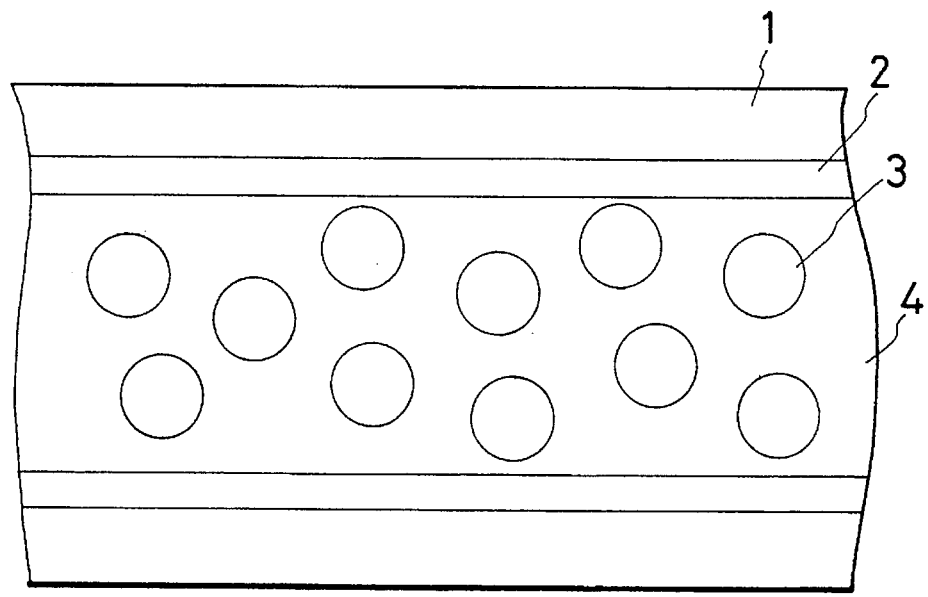
FIG. 3 shows schematically a structure of an embodiment of a liquid crystal electro-optical device according to the present invention.

As shown in FIG. 3, a light-transmitting electrically conductive film of an oxide of indium and tin (Indium-Tin-Oxide; ITO) (2) was deposited on a first substrate (1) at a thickness of from 500 to 2,000 Å by vapor deposition or by sputtering. The sheet resistance of the thus deposited film was from 20 to 200 $\Omega/cm^2$. The sheet thus obtained was patterned by a conventional photolithographic technology to obtain a first substrate (1). Similarly, a second substrate having provided thereon a second light-transmitting electrode was fabricated and laminated with the first substrate incorporating a spacer therebetween to maintain a spacing of from 5 to 50 µm, and preferably, from 7 to 20 µm.

Figure 1:
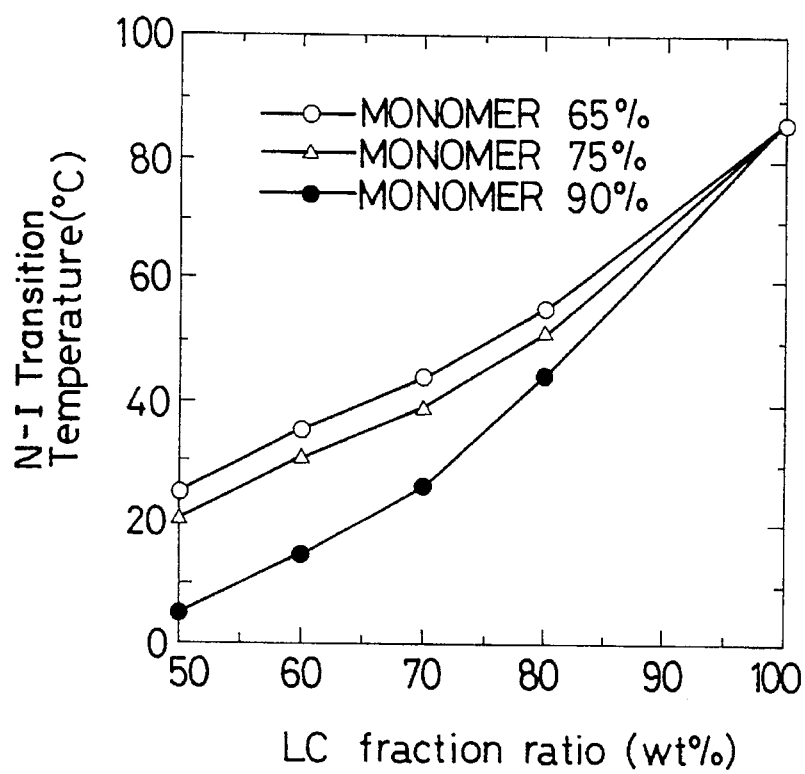
FIG. 1 shows an example of transition temperatures of liquid crystal materials suited for use in the liquid crystal electro-optical device according to the present invention.

A cyanobiphenyl nematic liquid crystal having a refractive index of 1.518 and a $\Delta n$ of 0.2240 was used together with a mixed system of an urethane-based oligomer and an acrylic monomer, having a refractive index of 1.573, as a non-solidified photo-curable resin. The photo-curable resin in the mixed system used in the present Example contains the urethane oligomer and the acrylic monomer at an oligomer to monomer ratio by weight of 35:65, and this photo-curable resin was mixed with the liquid crystal at a ratio by weight of 50:50. Droplets began to precipitate in the mixed system at about 25° C. The precipitation temperature (referred to hereinafter as the "N-I transition temperature") of the droplets from the mixed system can be related to the mixing ratio of the liquid crystal material and the resin as shown in FIG. 1.

The mixed system of liquid crystal and resin above was injected into a liquid crystal cell defined by the first and the second substrates at room temperature, and ultraviolet (UV) light (ray) was irradiated thereto with the mixture being provided between the first and the second substrates at a UV light irradiation density (energy density) of from about 10 to 100 mW/cm$^2$ for a duration of about 30 to 300 seconds to cure the resin while allowing the system to undergo phase separation between the liquid crystal and the resin. Thus was fabricated a liquid crystal electro-optical device. Room temperature as referred herein corresponds to about 25° C. Droplets from 1 to 3 µm in size and about 1.5 µm in average were found to be uniformly distributed over the liquid crystal electro-optical device.

Figure 4:
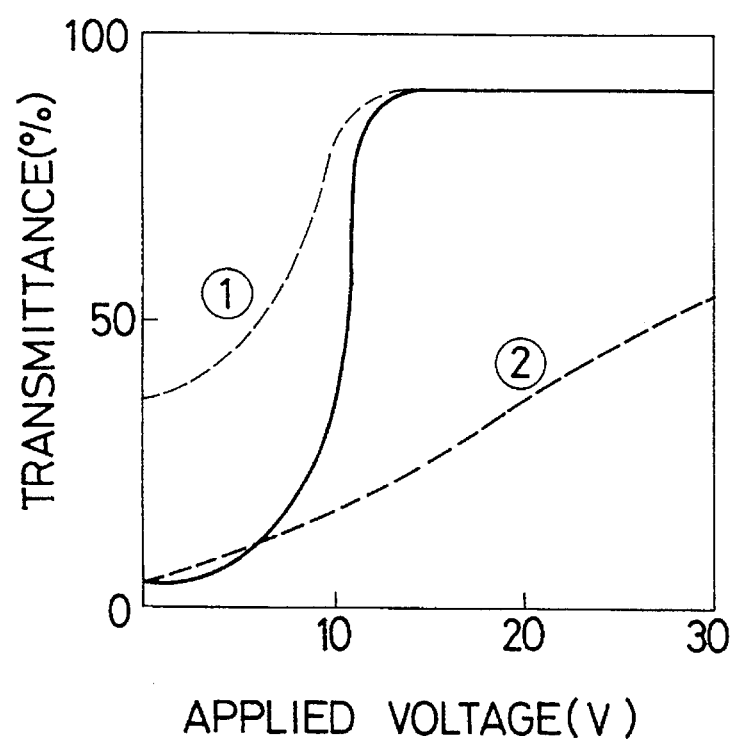
FIG. 4 shows the relationship between the driving voltage and the transmittance of a liquid crystal electro-optical device according to the present invention.

The liquid crystal electro-optical device thus obtained yielded a sufficiently high transmittance when a driving voltage of from 15 to 25 V, i.e., an ordinary voltage range for a conventional liquid crystal electro-optical device, as shown with broken lines marked (1) in FIG. 4, however, only a poor contrast resulted under zero electric field because scattering occurred to yield a transmittance as high as about 30%.

EXAMPLE 2

Liquid crystal material and photo-curable resin similar to those used in Example 1 were used in the present Example. Thus, the urethane oligomer and the acrylic monomer were mixed at a ratio by weight in the range of 10:90, and the liquid crystal and the photo-curable resin were mixed at a ratio by weight of 70:30. Droplets precipitated from the mixture at about 26° C. The mixing ratio of the liquid crystal material and the resin is related to the N-I transition temperature as in FIG. 1.

The mixed system of liquid crystal and resin above was injected into a liquid crystal cell defined by the first and second substrates as described above at room temperature, i.e., at a temperature at the vicinity of the N-I transition point, and ultraviolet (UV) light was irradiated thereto at a UV light irradiation density of from about 10 to 100 mW/cm$^2$ for a duration of about 30 to 300 seconds to cure the resin while allowing the system to undergo phase separation between the liquid crystal and the resin. Thus was fabricated a liquid crystal electro-optical device. Droplets from 1 to 5 µm in size and about 1.5 µm in average were found to be uniformly distributed over the liquid crystal electro-optical device.

The liquid crystal electro-optical device thus obtained yielded a sufficiently high transmittance when a driving voltage of from 15 to 25 V, i.e., an ordinary voltage range for a conventional liquid crystal electro-optical device was applied, and a favorable scattering to give a transmittance as low as in the range of 1 to 5% when no electric field was applied. Thus, a sufficient contrast was obtained.

It can be seen clearly from the figure that the liquid crystal electro-optical device according to the present invention can be obtained by controlling the fabrication temperature as well as selecting the amount of the liquid crystal to allow sufficient scattering to take place. It can be seen that a liquid crystal electro-optical device having an improved scattering properties under zero applied electric field was obtained without impairing the preferred driving voltage.

EXAMPLE 3

A cyanobiphenyl nematic liquid crystal having a refractive index of 1.530 and a Δn of 0.267 was used together with a mixed system of an urethane-based oligomer and an acrylic monomer, having a refractive index of 1.573, as a photo-curable resin. The mixture of the liquid crystal and the resin above was injected into a liquid crystal cell defined by the first and the second substrates above. The urethane oligomer and the acrylic monomer were mixed at a ratio by weight of 10:90, and the liquid crystal and the photo-curable resin were mixed at a ratio by weight of 73:27. Droplets precipitated from the mixture at about 10° C. The mixing ratio of the liquid crystal material and the resin is related to the N-I transition temperature as in FIG. 2.

The mixed system of liquid crystal and resin above was injected into a liquid crystal cell defined by the first and the second substrates as described above at room temperature, and UV light was irradiated thereto at an irradiation density of from about 10 to 100 mW/cm$^2$ for a duration of about 30 to 300 seconds to cure the resin while allowing the system to undergo phase separation between the liquid crystal and the resin. Thus was fabricated a liquid crystal electro-optical device. Droplets from 1 to 3 µm in size and about 1.0 µm in average were found to be uniformly distributed over the liquid crystal electro-optical device.

The liquid crystal electro-optical device thus obtained yielded an insufficient transmittance as shown in FIG. 4 with broken lines (2) even in the driving voltage range of from 15 to 25 V, i.e., an ordinary voltage range for a conventional liquid crystal electro-optical device, and no sufficiently high contrast was available.

EXAMPLE 4

Liquid crystal material and photo-curable resin similar to those used in Example 3 were used in the present Example. Thus, the urethane oligomer and the acrylic monomer were mixed at a ratio by weight of 35:65, and the liquid crystal and the photo-curable resin were mixed at a ratio by weight of 75:25. Droplets precipitated from the mixture at about 25° C. The mixing ratio of the liquid crystal material and the resin is related to the N-I transition temperature as in FIG. 2.

The mixed system of liquid crystal and resin above was injected into a liquid crystal cell defined by the first and the second substrates as described above at room temperature, and ultraviolet (UV) light was irradiated to the mixed system at an irradiation density of from about 10 to 100 mW/cm$^2$ for a duration of about 30 to 300 seconds to cure the resin while allowing the system to undergo phase separation between the liquid crystal and the resin. Thus was fabricated a liquid crystal electro-optical device. Droplets from 1 to 5 µm in size and about 1.5 µm in average were found to be uniformly distributed over the liquid crystal electro-optical device.

The liquid crystal electro-optical device thus obtained yielded a sufficiently high transmittance as shown in FIG. 4 with solid line when a driving voltage of from 15 to 25 V, i.e., an ordinary voltage range for a conventional liquid crystal electro-optical device was applied, and a scattering to give a transmittance as low as in the range of 1 to 5% when no electric field was applied. Thus, a sufficient contrast was obtained.

Figure 2:
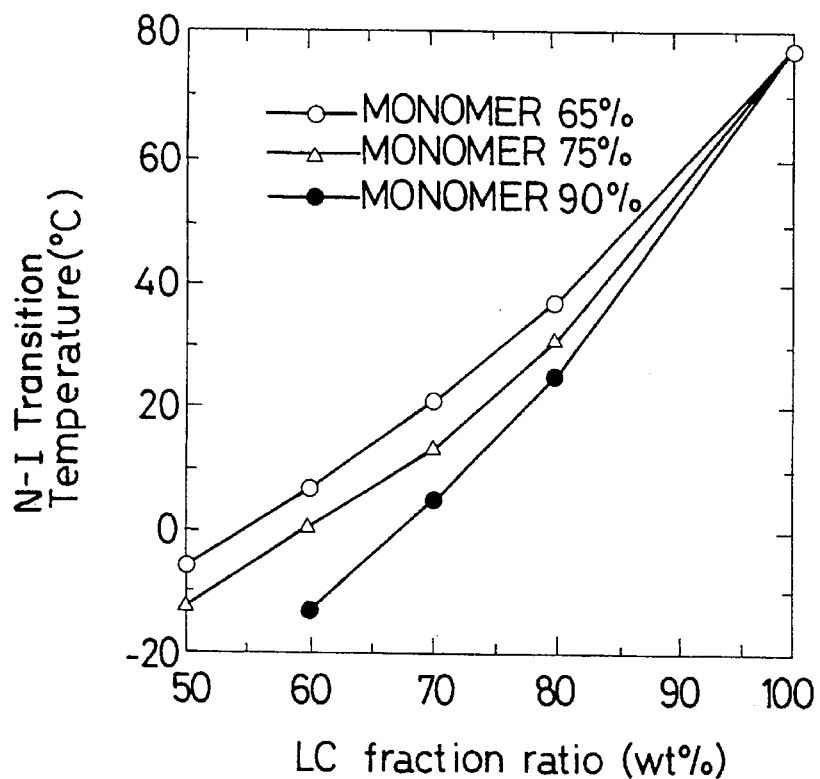
FIG. 2 shows another example of transition temperatures of liquid crystal materials suited for use in the liquid crystal electro-optical device according to the present invention.

As described in the foregoing Examples which illustrate the process for fabricating liquid crystal electro-optical device according to the present invention, it can be seen that the precipitation temperature of the droplets from the mixed system can be controlled by varying the amount of the oligomer or the monomer which constitute the photo-curable resin composition as illustrated in FIGS. 1 and 2. Accordingly, the resin material can be solidified at a vicinity of the desired temperature suited for the fabrication process.

In FIG. 4, the broken lines show the characteristic curves for the liquid crystal electro-optical device according to Example 1 or Example 3; the solid line represents the same for the liquid crystal electro-optical device according to Example 2 or Example 4.

In FIG. 4, the ordinate represents the transmittance of the liquid crystal electro-optical device, and the abscissa represents the driving voltage. The thickness of each of the liquid crystal electro-optical device was maintained uniform to discuss directly the variation in transmittance by comparing the transmittance as read on the ordinate.

As read clearly from the Figure, the liquid crystal electro-optical device according to the present invention is obtained by controlling the amount of the polymers constituting the light-transmitting resin when the quantity of the liquid crystal necessary for favorable scattering is attained. The liquid crystal electro-optical device thus obtained yields improved scattering characteristics at zero applied electric field yet maintaining the driving voltage in the preferred range.

In the foregoing Examples, a light-transmitting electrically conductive film of an oxide of indium and tin (Indium-Tin-Oxide; ITO) (2) was deposited on a first substrate (1) at a thickness of from 500 to 2,000 Å by a known vapor deposition or by sputtering process to give a structure as shown in FIG. 3. The sheet resistance of the thus deposited film was from 20 to 200 $\Omega/cm^2$. The sheet thus obtained was patterned by a conventional photolithographic technology to obtain a first substrate (1). Similarly, a second substrate having provided thereon a second light-transmitting electrode was fabricated and laminated with the first substrate incorporating a spacer therebetween to maintain a spacing of from 5 to 50 μm, and preferably, from 7 to 20 μm.

The liquid crystal having introduced into the liquid crystal cell thus obtained was a P-type cyanobiphenyl-based nematic liquid crystal, however, an N-type nematic liquid crystal, a ferroelectric liquid crystal, or a non-ferroelectric liquid crystal may be used as well. Furthermore, a polymer liquid crystal may also be used. The liquid crystal enumerated above may further contain a dye. A light-transmitting resin may be a photocurable resin, or an epoxy resin so long as it is of a type which solidifies under a given condition to support the liquid crystal being dispersed therein.

The liquid crystal electro-optical device according to the present invention may be fabricated from an electro-optical modulating layer containing liquid crystal droplets which are sectioned with the wall of a resin, or such having a three-dimensionally developed resin structure.

As described in the illustrative Examples above, the present invention provides a liquid crystal electro-optical device having favorable scattering properties and which provides a display with high contrast under a pertinent driving voltage. This is attributed to the fabrication process which is characterized by the solidification temperature of the resin being controlled without changing the quantity of the liquid crystal being incorporated in the device. Because of this process, the liquid crystal can be divided into a large number of fine liquid crystal droplets of uniform size.

In the foregoing Examples, an ultraviolet light is used to cure the resin (organic substances), however, a light energy, a thermal energy, or both of them may be supplied to the mixture of the liquid crystal and the organic substances to separate the liquid crystal from the organic substances and to harden the organic substances.

The present invention provides a process for fabricating a dispersion type liquid crystal electro-optical device having improved light scattering properties under zero applied electric field without changing the driving voltage. Furthermore, the dispersed liquid crystal droplets can be controlled to an ideal and uniform size by improving compatibility between the resin support and the liquid crystal. Accordingly, an extremely high display contrast was realized.

A liquid crystal display having low loss and an extremely high display contrast was also achieved by excluding polarizer sheets.

The process for fabricating the liquid crystal electro-optical device according to the present invention comprises changing the fraction of the polymer constituting the light-transmitting resin to control arbitrarily the compatibility between the liquid crystal material and the light-transmitting resin material and to control the precipitation temperature of the liquid crystal droplets from the mixture of resin materials and liquid crystal materials as desired. In this manner, the resin can be solidified at a state which exhibits favorable scattering properties. Accordingly, a liquid crystal electro-optical device having excellent scattering properties can be fabricated without changing the number and size of the liquid crystal droplets necessary for light scattering. Thus, the fabrication process according to the present invention provides the liquid crystal electro-optical device at high reproducibility and efficiency without strictly controlling the temperature in solidifying the resin.

What is claimed is:

1. A method for forming an electro-optical device comprising the steps of:

controlling a weight ratio of oligomer and monomer which are included in an organic substance in order to precipitate a droplet of a liquid crystal from a mixture of said liquid crystal and the organic substance at room temperature; and supplying said mixture with an energy selected from the group consisting of a light energy, a thermal energy and both thereof about said room temperature to separate said liquid crystal from said organic substance and to harden said organic substance, wherein a mixing ratio of the liquid crystal and the organic substance is set so that the liquid crystal is compatible with the organic substance, and wherein droplets of the liquid crystal are uniformly distributed through said mixture after the organic substance is hardened.

2. The method of claim 1 wherein said liquid crystal comprises a ferroelectric liquid crystal.

3. The method of claim 1 wherein said organic substance comprises urethane oligomer and acrylic monomer.

4. The method of claim 3 wherein said urethane oligomer and said acrylic monomer are photocurable resins.

5. The method of claim 4 wherein said mixture is supplied with an ultraviolet ray.

6. The method of claim 5 wherein said supplying is carried out with said mixture being provided between a pair of substrates.

7. The method of claim 3 wherein said ultraviolet ray has an energy density of 10 to 100 $mW/cm^2$.

8. The method of claim 5 wherein said ultraviolet ray is irradiated to said mixture for 30 to 300 seconds.

9. The method of claim 1, wherein each droplet is 1 to 3 μm in size.

10. The method of claim 1, wherein said liquid crystal comprises a nematic liquid crystal.

11. The method of claim 1, wherein said liquid crystal comprises a smectic liquid crystal.

12. The method of claim 1, wherein said liquid crystal comprises a cholesteric liquid crystal.

13. A method for forming an electro-optical device comprising the steps of:

controlling a weight ratio of oligomer and monomer which are included in an organic resin in order to precipitate droplets of a liquid crystal from a mixture of the liquid crystal and the organic resin at room temperature; and supplying the mixture with an energy at room temperature to separate the liquid crystal from the resin and to cure the resin, wherein a mixing ratio of the liquid crystal and the organic resin is set so that the liquid crystal is compatible with the organic resin, and wherein the droplets are uniformly distributed through said mixture after the resin is cured.

14. The method of claim 1 wherein the energy includes one of a light energy, a thermal energy, and both thereof.

15. The method of claim 13 wherein the resin is urethane oligomer and acrylic monomer.

16. The method of claim 1 wherein each droplet is 1 to 3 μm in size.

17. A method for forming an electro-optical device comprising the steps of:

controlling a weight ratio of oligomer and monomer which are included in an organic resin in order to precipitate droplets of a liquid crystal from a mixture of the liquid crystal and the resin at room temperature; and separating the organic resin from the liquid crystal and curing it at room temperature wherein the droplets are uniformly distributed through said mixture after the resin are is cured.

* * * * *